United States Patent
Sala et al.

(10) Patent No.: US 10,458,498 B2
(45) Date of Patent: Oct. 29, 2019

(54) LOCKING DEVICE OF AN ELECTROMAGNETICALLY-OPERATED BRAKE CALIPER, BRAKE CALIPER COMPRISING SAID CALIPER, METHOD FOR OPERATING SAID CALIPER

(71) Applicant: FRENI BREMBO S.P.A., Curno, Bergamo (IT)

(72) Inventors: Paolo Sala, Curno (IT); Fabio Ghislandi, Curno (IT); Massimo Di Stefano, Curno (IT); Luca Cappelletti, Curno (IT); Beniamin Szewczyk, Curno (IT); Alessandro Rossi, Curno (IT); Stefano Dossi, Curno (IT)

(73) Assignee: Freni Brembo S.p.A, Curno, Bergamo (IT)

( * ) Notice: Subject to any disclaimer, the term of this patent is extended or adjusted under 35 U.S.C. 154(b) by 0 days.

(21) Appl. No.: 15/569,790

(22) PCT Filed: Apr. 27, 2016

(86) PCT No.: PCT/IB2016/052383
§ 371 (c)(1),
(2) Date: Oct. 27, 2017

(87) PCT Pub. No.: WO2016/174587
PCT Pub. Date: Nov. 3, 2016

(65) Prior Publication Data
US 2018/0135710 A1    May 17, 2018

(30) Foreign Application Priority Data

Apr. 27, 2015    (IT) .................... 102015902346607

(51) Int. Cl.
*F16D 65/18*    (2006.01)
*B60T 13/74*    (2006.01)
(Continued)

(52) U.S. Cl.
CPC ............ *F16D 65/18* (2013.01); *B60T 13/741* (2013.01); *F16D 2121/24* (2013.01);
(Continued)

(58) Field of Classification Search
CPC .......... F16D 65/18; F16D 65/22; F16D 65/52; F16D 2121/24; B60T 1/005; B60T 13/74
(Continued)

(56) References Cited

U.S. PATENT DOCUMENTS 6,267,207 B1 *   7/2001   Fleischer ................ B60T 7/107
                                                          188/106 P
6,315,092 B1   11/2001   Schwarz
(Continued)

FOREIGN PATENT DOCUMENTS

| EP | 1032773 B1 | 9/2000 |
| EP | 1218646 B1 | 3/2005 |
| EP | 1985883 B1 | 8/2011 |

OTHER PUBLICATIONS

European Patent Office, International Search Report with Written Opinion issued in PCT/IB201/052383, dated Jul. 15, 2016, 13 pages, European Patent Office, Rijswijk, Netherlands.

*Primary Examiner* — Christopher P Schwartz
(74) *Attorney, Agent, or Firm* — Marshall & Melhorn, LLC

(57) ABSTRACT

A locking device of an electromechanically-operated brake caliper for a disc brake, comprising a ratchet comprising a rotating element having at least one first cam and one first follower pushed elastically against said rotating element, configured to act in conjunction with said at least one first cam to allow the rotation of the rotating element in a first direction of rotation, and to prevent the rotation of the rotating element in a second direction of rotation, opposite to said first direction of rotation; a selector element sliding between a first selector element position and a second
(Continued)

selector element position, said selector element being adapted to operate said first follower so that, in said first selector element position, said selector element keeps said first follower in a disengaged position away from the rotating element in which the application of a parking braking action is prevented, and so that, in said second selector element position, the selector element keeps said first follower in an engaged position in contact with said rotating element in which a parking braking action can be applied; said selector element having a second cam and said first follower having a first follower opening forming a second follower, said second cam being configured to act in conjunction with said second follower to operate said first follower between said engaged position and said disengaged position.

6 Claims, 12 Drawing Sheets

(51) Int. Cl.
　　*F16D 121/24*　　(2012.01)
　　*F16D 127/06*　　(2012.01)
　　*F16D 125/34*　　(2012.01)
　　*F16D 125/48*　　(2012.01)
　　*F16D 125/58*　　(2012.01)
　　*F16D 129/04*　　(2012.01)

(52) U.S. Cl.
　　CPC ...... *F16D 2125/34* (2013.01); *F16D 2125/48* (2013.01); *F16D 2125/582* (2013.01); *F16D 2127/06* (2013.01); *F16D 2129/04* (2013.01)

(58) Field of Classification Search
　　USPC ...... 188/73.39, 156–164, 31, 265; 192/219.5
　　See application file for complete search history.

(56) References Cited

U.S. PATENT DOCUMENTS

| | | | |
|---|---|---|---|
| 6,752,249 B1* | 6/2004 | Jungbecker | F16D 65/18 188/162 |
| 7,677,367 B2* | 3/2010 | Usui | F16D 65/18 188/156 |
| 8,056,683 B2* | 11/2011 | Usui | F16D 65/18 188/156 |
| 8,678,147 B2 | 3/2014 | Usui | |
| 9,568,057 B2* | 2/2017 | Kwon | F16D 65/18 |
| 2003/0066719 A1* | 4/2003 | Watanabe | B60T 1/005 188/72.7 |
| 2005/0077126 A1* | 4/2005 | Baumgartner | F16D 65/183 188/218 XL |
| 2010/0032250 A1* | 2/2010 | Cantoni | F16D 55/2262 188/72.3 |
| 2010/0051395 A1* | 3/2010 | Sano | B60T 1/005 188/162 |
| 2014/0034432 A1* | 2/2014 | Bull | B60T 13/741 188/106 R |
| 2014/0083804 A1* | 3/2014 | Yasuda | B60T 13/741 188/71.8 |

* cited by examiner

LOCKING DEVICE OF AN ELECTROMAGNETICALLY-OPERATED BRAKE CALIPER, BRAKE CALIPER COMPRISING SAID CALIPER, METHOD FOR OPERATING SAID CALIPER

FIELD OF THE INVENTION

The present invention relates to a locking device for an electromechanically-operated brake caliper for carrying out a parking braking, for example said caliper being of the type capable of performing both a service braking and a parking braking. Moreover, the present invention relates to a brake caliper comprising such a locking device.

BACKGROUND ART

As is known, in calipers for disc brakes, opposite pads are pushed by means of at least one piston adapted to slide in a respective seat in the body of the caliper, against opposite braking surfaces of a braking band of a brake disc which can be associated with the caliper to stop the disc brake.

Electromechanical brake calipers comprise an electromechanical actuator having an electric motor and a device for converting the motion from rotational motion output from the motor to translational motion of the piston.

For example, the motion conversion device comprises a handling screw, for example a recirculating screw, rotated by the motor, in which the screw is housed in the body of the piston so that a rotation of the screw corresponds with a translation of the piston.

By operating the electric motor in rotation in one direction of rotation or in the opposite direction of rotation, a translation moving the piston close to or away from the braking surfaces of the disc, respectively, is obtained.

Such electromechanical brake calipers may provide both the service braking and the parking braking.

In the case of service braking, such calipers need to ensure stability of the vehicle, high electromechanical performance, short response times and low inertias.

In the case of parking braking, once the required clamping load is reached, they have the need to ensure the braking force is maintained over time.

With reference to parking braking, Patent EP1032773B1 entitled to Continental Teves AG discloses a parking braking device which uses a ratchet that locks an element of a mechanical drive once the actuator is no longer electrically powered.

Such a device has the disadvantage that it is to be constantly powered during use to avoid the brake from locking and the disadvantage that it is instantly blocked as soon as the supply voltage of the device falls or is removed. Thus, in case of breakdown, for example a breakdown of the actuator, demagnetization, excessive heat, mechanical fatigue, the instantaneous locking of the brake would have a negative impact on the stability of the vehicle and on the safety of the driver.

Patent EP1218646B1 entitled to Continental Teves AG and INA Walzlager Schaeffler discloses an electromechanically-operated disc brake comprising a post and a locking element with a spherical or roller shape, for allowing or preventing the rotation of a drive wheel. The locking of the mechanical drive occurs by means of the operation of a solenoid electromagnetic actuator which, by translating the post towards the wheel, prevents the passage of an engagement sphere, thus locking the transmission and preventing a removal of a parking braking action.

This device has the disadvantage that the breakdown of the actuator would instantaneously cause an unwanted operation, thus causing the instability of the vehicle or the loss of parking of the vehicle.

Moreover, Patent EP1985883 entitled to Hitachi Ltd discloses an electric disc brake comprising a caliper body and a locking mechanism in which the locking mechanism moves with a thrust element of the pad and consists of a movable element having a plurality of teeth with a predetermined pitch in a direction of movement, an engagement element having an engagement portion which can be engaged with the teeth of the movable element, an actuator which guides the engagement element in such a direction that the engagement portion engages with the teeth of the movable element and operating means for operating the engaged element in a direction in which the engagement portion separates from the teeth of the movable element.

This device has the disadvantage that, by starting from the parking condition already applied, the reapplication of the load occurs only if the engagement element reaches at least the tooth adjacent to the already engaged tooth of the movable element. Should the motor not cover the entire angular sector between two teeth and be restricted to reaching a first intermediate point, this would result in the involuntary removal of the parking load, because the engagement element would come out of the movable element, thus releasing the braking load. Thus, an involuntary removal of the parking braking action could occur.

Moreover, this device has the disadvantage that the engagement element is constantly energized by an energizing means, for example a compression spring, in such a direction that such an engagement element is moved away from the teeth of the wheel. If such an energizing means should lose efficiency during the service, an involuntary application of the mechanism could occur.

Therefore, the need is strongly felt for a locking device of an electromagnetically-operated brake caliper capable of maximizing operation reliability and safety, while ensuring both the stability of the vehicle during the service braking and that the braking force is maintained during the parking braking.

SUMMARY OF THE INVENTION

It is therefore the object of the present invention to devise and provide a locking device of an electromagnetically-operated brake caliper which allows the aforesaid needs to be met while at least partly obviating the drawbacks indicated above with reference to the known art.

It is another object of the present invention to keep the brake caliper locked when required to maintain the parking action, and to keep the brake caliper released when required to avoid the risk of vehicle instability.

It is another object of the invention to allow the reapplication of the braking load to compensate for any thermal effects of the brake which contribute to an unwanted load reduction.

In particular, it is the object of the present invention to provide a locking device of an electromagnetically-operated brake caliper capable of avoiding the involuntary application or removal of the parking brake when not required, for example in case of interruption of the electricity supply or of breakdown.

These and other objects and advantages are achieved by means of a locking device for an electromagnetically-operated brake caliper according to claim 1, and also by means of an electromagnetically-operated caliper comprising such a device, and also by means of a method for operating said caliper, as claimed in the further independent appended claims.

Further objects, solutions and advantages are found in the embodiments described below and claimed in the dependent claims.

BRIEF DESCRIPTION OF THE DRAWINGS

The invention will be disclosed below with the description of certain embodiments thereof, made by way of a non-limiting example, with reference to the accompanying drawings in which.

DESCRIPTION OF THE PREFERRED EMBODIMENTS

Figure 1:
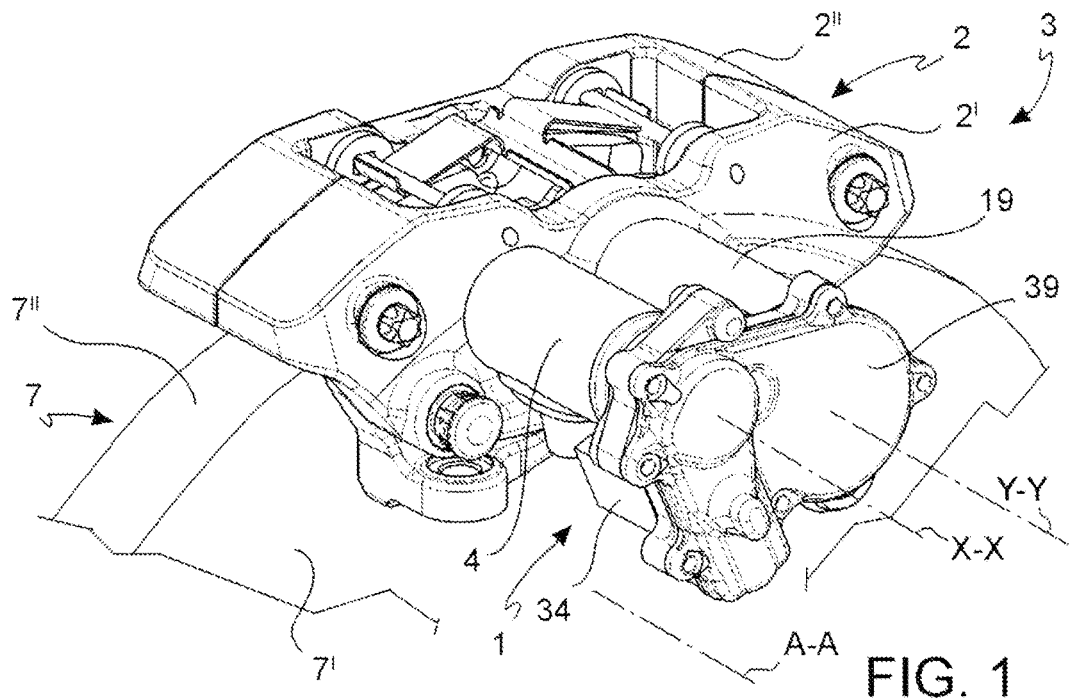
FIG. 1 shows a perspective view of an example of a brake caliper comprising a locking device of an electromagnetically-operated brake caliper according to the invention.
Figure 2:
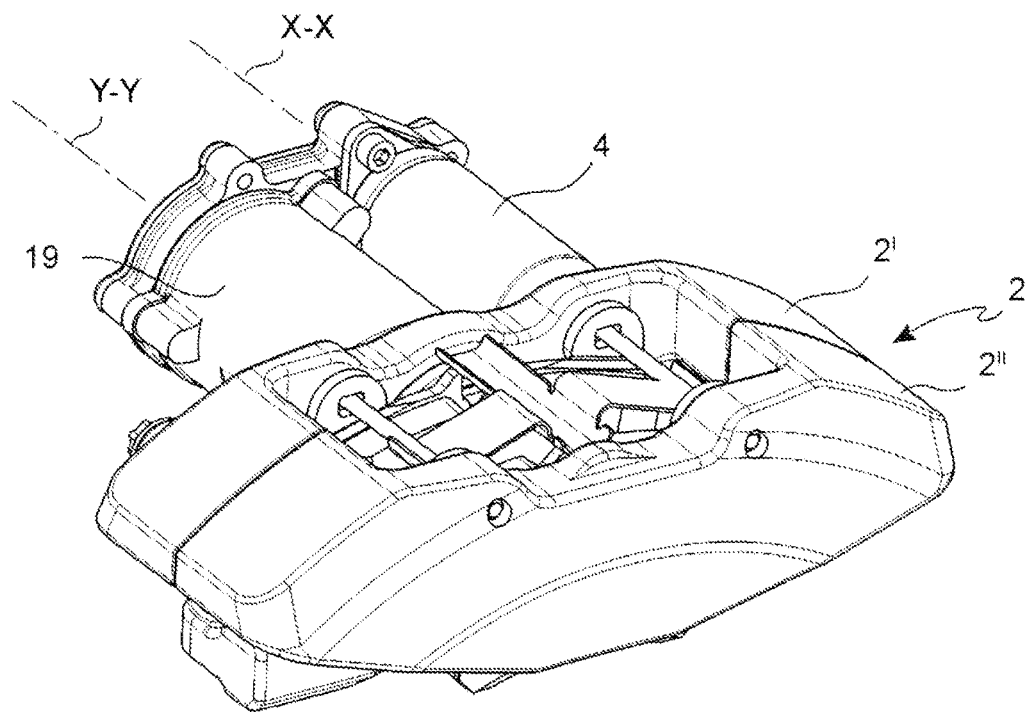
FIG. 2 shows another perspective view of the brake caliper in FIG. 1.
Figure 3:
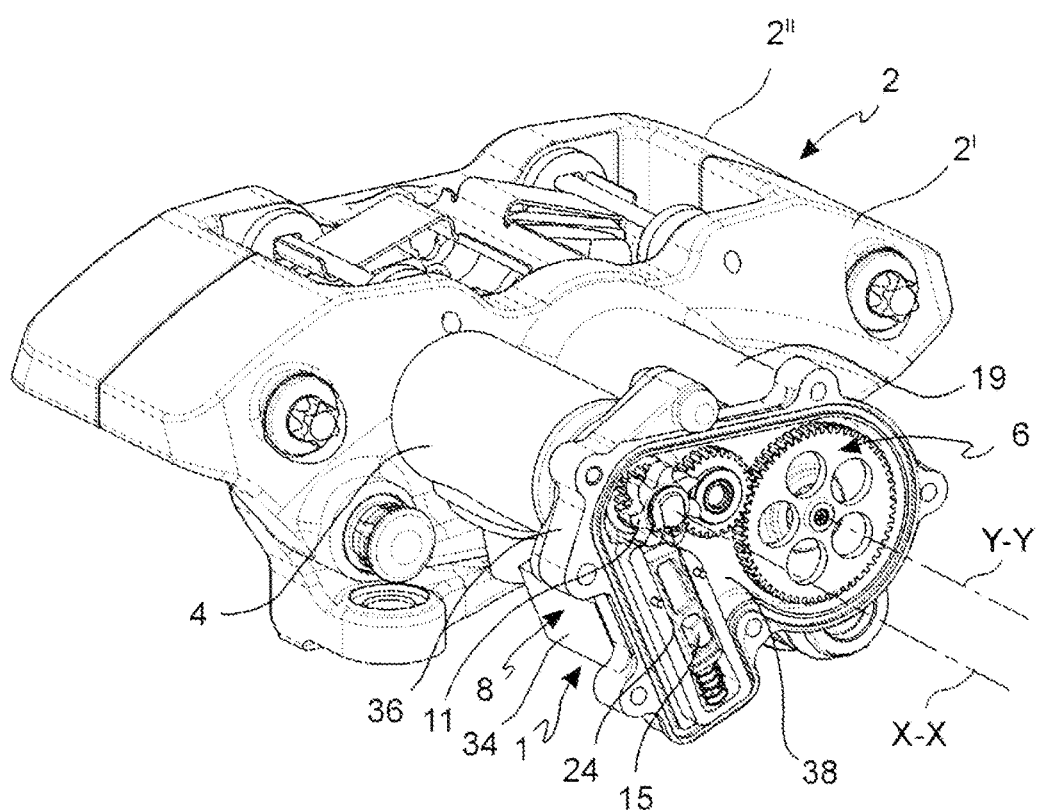
FIG. 3 shows the perspective view in FIG. 1, in which an example of a locking device of an electromagnetically-operated brake caliper according to the invention is made visible by removing a closing cover.

With reference to the figures and according to a general embodiment, a locking device of an electromechanically-operated brake caliper for a disc brake according to the invention is generally indicated with numeral 1.

The locking device 1 comprises a ratchet 8 comprising a rotating element 11 having at least one first cam 12 and one first follower 13 pushed elastically against said rotating element 11, the first follower being configured to act in conjunction with said first cam 12 to allow the rotation of the rotating element 11 in a first direction of rotation A and to prevent the rotation of the rotating element in a second direction of rotation R, opposite to said first direction of rotation.

In accordance with one embodiment, said first direction of rotation A is a counterclockwise direction of rotation and said second direction of rotation R is a clockwise direction of rotation.

In accordance with one embodiment, the rotating element 11 is a wheel defining a wheel rotation axis 22, for example stationary or integral with the caliper body 2, and a wheel radial direction 23 orthogonal to the wheel rotation axis 22.

In accordance with one embodiment, the at least one cam 12 extends in the radial direction.

According to one embodiment, the at least one first cam 12 comprises a first cam profile segment 12' and a second cam profile segment 12" adjacent to said first cam segment 12'.

According to one embodiment, the first cam profile segment 12' is arranged in the radial direction, or in a direction that promotes the engagement thereof with the first follower 13 and the maintenance of such a position, for example the first cam profile segment is rectilinear.

In accordance with one embodiment, the second cam profile segment 12" is inclined with respect to the radial direction 23, for example the second cam profile segment 12" extends in a direction adapted to promote the sliding of the second cam profile segment 12" with respect to the first follower 13, said first follower 13 being pushed against said second cam profile segment 12", for example said second cam profile segment 12" is curved, for example said second cam profile segment 12" is convex moving away from the wheel axis 22 in the radial direction.

In accordance with one embodiment, the second cam profile segment 12" moves away from the wheel axis by angularly moving close to said first cam profile segment 12' on only one side of said first cam profile segment 12'.

In accordance with one embodiment, the first cam profile segment 12' is facing in a direction of clockwise rotation of the wheel 11.

In accordance with one embodiment, the at least one first cam 12 is defined by a first cam surface and by a second cam surface adjacent to the first cam surface, in which such a first cam surface comprises said first cam profile segment 12', and for example such a second cam surface comprises said second cam profile segment 12".

In accordance with one embodiment, the first cam surface and/or the second cam surface extend according to directions parallel to the wheel axis 22.

In accordance with one embodiment, the rotating element 10 comprises a plurality of cams 12 as described above, for example distributed along the periphery of said wheel 11, for example equally spaced from one another at a pitch having a predetermined value.

In accordance with one embodiment, the plurality of cams comprises seven cams, for example substantially equal to one another.

In accordance with one embodiment, the pitch value is chosen so as to ensure a safe and firm engagement of said rotating element 11 against said first follower 13 to prevent the rotation of the rotating element in a second direction of rotation R and at the same time to ensure a free rotation of the rotating element in the first direction of rotation A.

The first follower 13 is restrained to the locking device 1 to slide in a predetermined first follower sliding direction S-S with respect to the rotating element 11.

In accordance with one embodiment, the first follower 13 comprises an elongate element which extends in said first follower sliding direction S-S and comprises a free end 17 facing the rotating element 11.

In accordance with one embodiment, the free end 17 of the first follower 13 is defined by a side surface 17' arranged laterally, or longitudinally, with respect to the first follower sliding direction S-S, and by a head surface 17" arranged transversely with respect to the first follower sliding direction S-S.

In accordance with one embodiment, the side surface 17' is configured to receive in abutment the first cam profile segment 12' of a first cam 12, and the head surface 17" is adapted to receive in abutment the second cam profile segment 12" of another first cam 12 arranged downstream of the first cam 12 in the second direction of rotation R.

In accordance with one embodiment, the first follower sliding direction S-S of the first follower 13 belongs to a plane orthogonal to the wheel axis 22 and is arranged in the tangential direction with respect to the wheel axis 22, or is orthogonal to a radial direction 23.

In accordance with one embodiment, said first follower is restrained to the locking device to rotate or roto-translate about a point of the locking device 1, and said first follower sliding direction S-S belongs to a plane orthogonal to the wheel axis 22 and consists of a line corresponding to the trajectory travelled by said first follower 13 during said rotation or roto-translation.

In accordance with one embodiment, the side surface 17' and the head surface 17" extend orthogonally to a plane orthogonal to the wheel axis 22.

In accordance with one embodiment, the side surface 17' and the head surface 17" are substantially orthogonal to each other.

In accordance with one embodiment, the side surface 17' and the head surface 17" are substantially orthogonal to each other, and they are inclined by a predetermined angle with respect to the first follower sliding direction S-S.

Thereby, when the first cam profile segment 12' abuts against the side surface 17', such a first cam profile segment 12' applies to the side surface 17' a thrust component which pulls the first follower 13 against wheel 11. In this circumstance, the head surface 17" abuts against the second cam profile segment of an adjacent cam 12, which applies to the head surface 17" a thrust component which opposes the thrust component that pulls the first follower against the wheel. Thereby, self-locking is obtained in these circumstances, which ensures the parking braking load is maintained over time.

In accordance with one embodiment, the side surface 17' extends in a direction parallel to the wheel radial direction 23, or in such a direction as to promote the engagement thereof with the first follower 13. For example, the head surface 17" extends in a direction orthogonal to the wheel radial direction 23, or tangentially to wheel 11.

In accordance with one embodiment, the side surface 17' extends along a plane parallel to a radial plane passing through the wheel axis 23, or along a plane which allows the engagement thereof with the first follower 13.

In accordance with one embodiment, the head surface 17" extends along a plane substantially orthogonal to a radial plane passing through the wheel axis 23.

Figure 11:
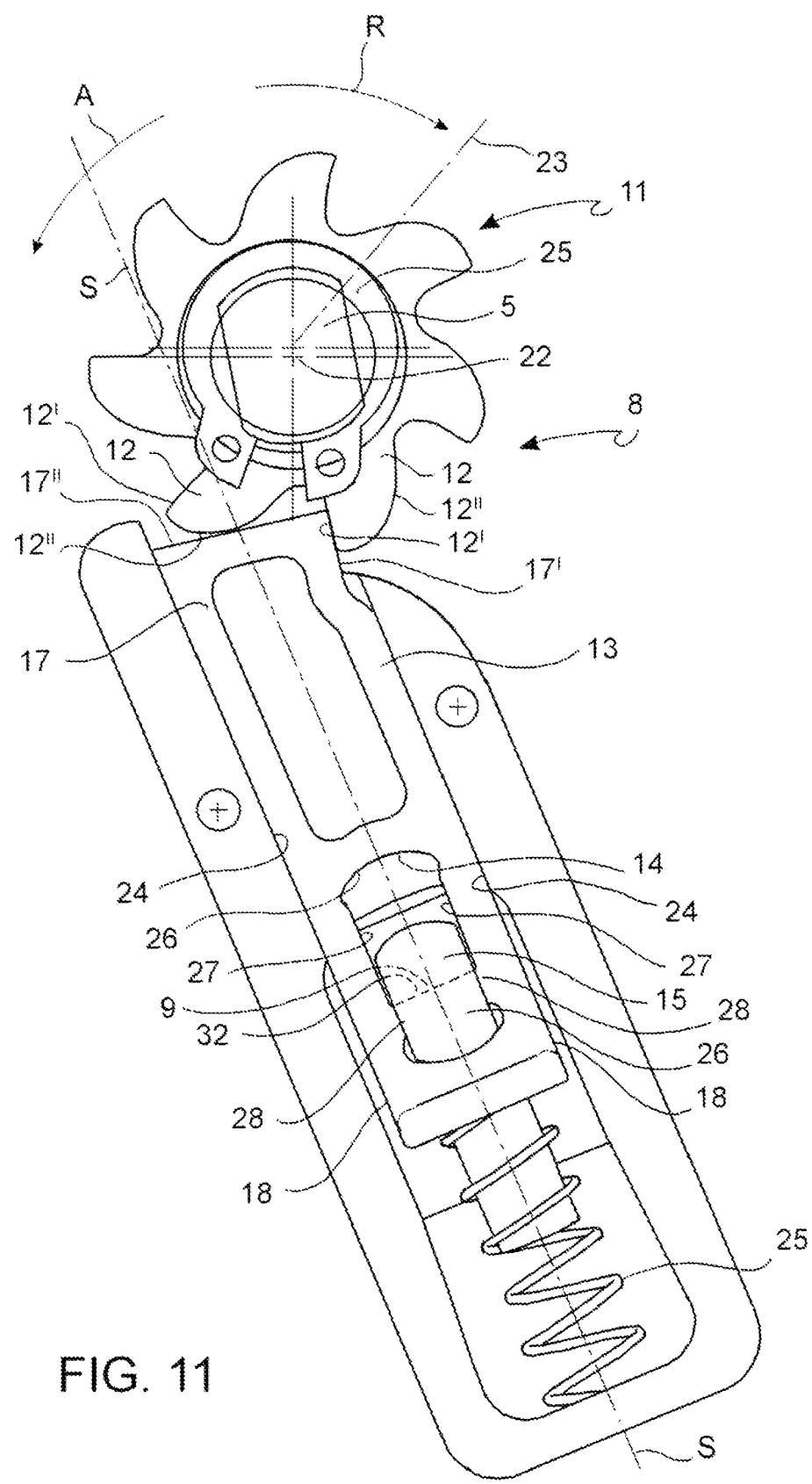
FIG. 11 shows an axonometric view of the locking device for an electromagnetically-operated brake caliper according to the invention.
Figure 12:
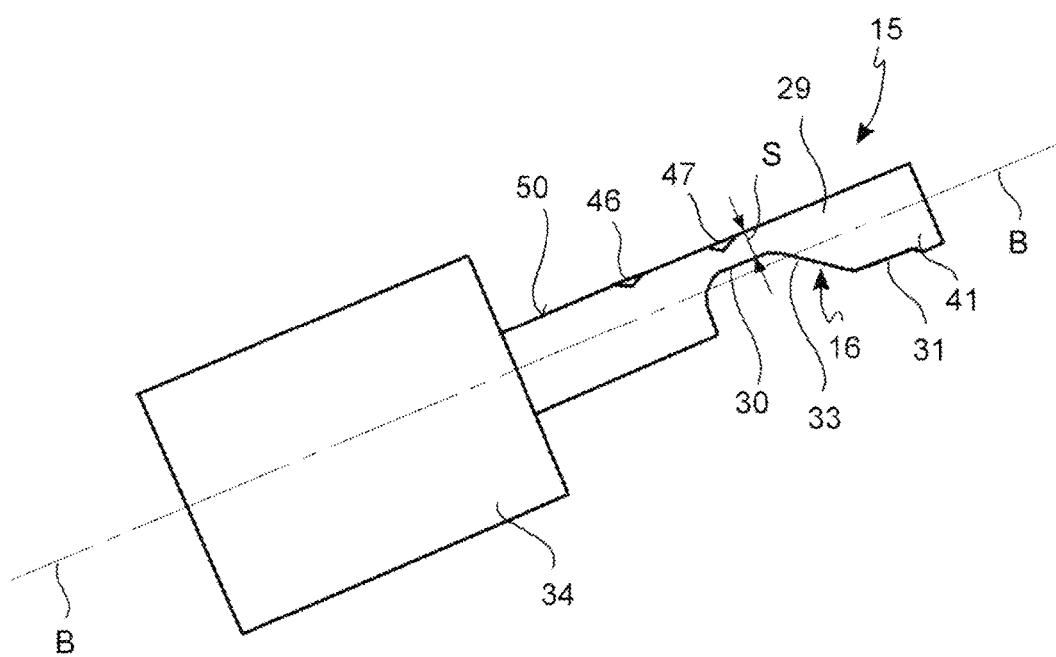
FIG. 12 shows a side view of a selector element associated with a linear actuator of a locking device according to the invention.

In accordance with one embodiment, as for example shown in FIG. 11, the first follower 13 comprises two opposite lateral sliding surfaces 18 parallel to each other and parallel to the first follower sliding direction S-S, slidingly engaged with counter sliding surfaces 24 which are integral with said locking device 1.

Figure 13:
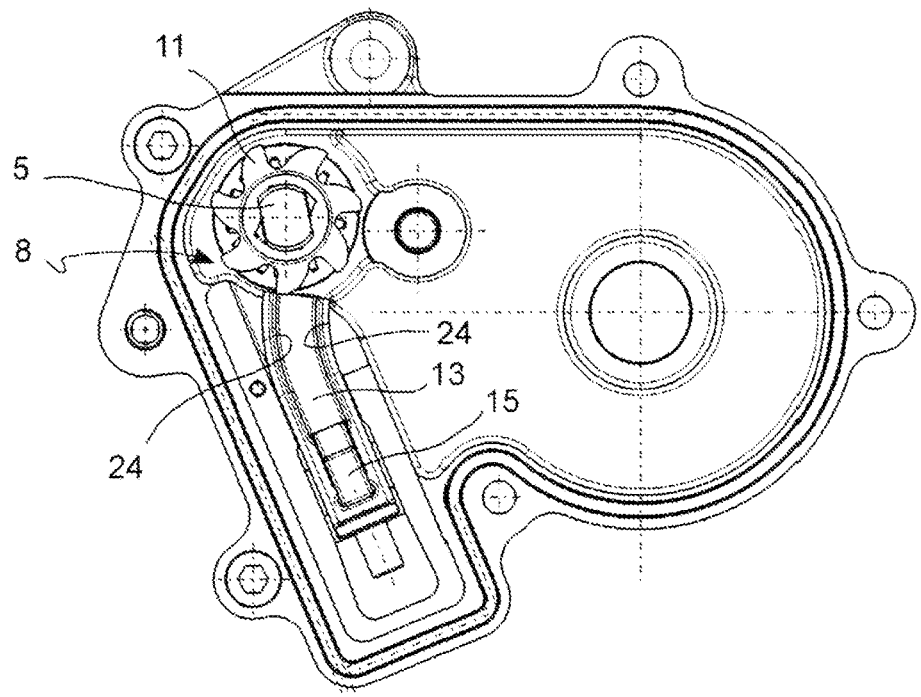
FIG. 13 shows an axonometric view of the locking device according to the invention, according to an alternative embodiment in which the follower comprises an elastically deformable portion.

In accordance with one embodiment, as shown for example in FIG. 13, the counter sliding surfaces 24 of the locking device are surfaces parallel to each other and having a curved portion approaching the rotating element 11, and at least one portion of the first follower 13 facing towards the rotating element is elastic so that the first follower 13 is elastically deformed along the curved counter surfaces 24 accumulating elastic energy upon sliding from the disengaged position to the engaged position, and so that said first follower 13 releases the elastic energy accumulated upon sliding from the engaged position to the disengaged position. This solution allows a thrust spring 25 for pushing the first follower 13 against the rotating element 11 to be avoided.

In accordance with one embodiment, ratchet 8 comprises elastic thrust means 25 which act against the first follower 13 in the first follower sliding direction S-S. For example, the thrust means comprise a compression spring.

The locking device 1 comprises a selector element 15 sliding between a first selector element position and a second selector element position, said selector element 15 being adapted to operate said first follower 13 so that, in said first selector element position, said selector element 15 keeps said first follower 13 in a disengaged position away from the rotating element 11 to prevent the application of a parking braking action, and so that, in said second selector element position, the selector element 15 keeps said first follower 13 in an engaged position in contact with said rotating element 11 to allow the application of a parking braking action.

The selector element 15 comprises a second cam 16 and the first follower 13 has a first follower opening 14 and a second follower 9, said second cam 16 being configured to act in conjunction with said second follower 9 to operate said first follower 13 between said engaged position and said disengaged position.

The selector element 15 comprises a pin portion 29 which extends in a selector element sliding direction B-B and the first follower opening 14 is an opening passing through the first follower 13 configured to allow the sliding therein of the pin portion 29 in said selector element sliding direction B-B.

The first follower opening 14 is defined by an opening edge 26, e.g. a closed opening edge.

Such an opening edge 26 comprises two straight opposite opening edge portions 27 parallel to each other and to the first follower sliding direction S-S.

In accordance with one embodiment, the closed opening edge 26 comprises a portion of the bottom opening edge 32 which connects one end of the opposite opening edge portions 27 furthest away from the free end of first follower 17 to each other.

In accordance with one embodiment, the portion of the bottom opening edge 32 forms said second follower 9.

In accordance with one embodiment, the portion of the bottom opening edge 32 is substantially straight and orthogonal to said opposite opening edge portions 27. In other words, the portion of the bottom abutment opening edge 32 is substantially straight and orthogonal to the first follower sliding direction S-S.

In accordance with one embodiment, the pin portion 29 comprises two side flattenings 28 parallel to each other. Such side flattenings 28 are adapted to act in conjunction with the straight opening edge portions 27 to guide the pin portion 29 during the sliding through the first follower opening 14, thus avoiding the rotation of the pin portion 29 with respect to the first follower opening 14. Moreover, such side flattenings 28 are adapted to also guide the sliding of the first follower 13 transversely to the pin portion 29 at the second cam 16.

In accordance with one embodiment, said selector element sliding direction B-B is substantially orthogonal to the first follower sliding direction S-S.

In accordance with one embodiment, said selector element sliding direction B-B is substantially parallel to the direction of the wheel rotation axis 22.

In accordance with one embodiment, the pin portion 29 comprises a notch which laterally penetrates said pin portion, said notch forming said second cam 16.

In accordance with one embodiment, said notch is defined by a cam surface which extends in a direction orthogonal to the selector element sliding direction B-B.

Said second cam 16 comprises a support segment 31 adapted to come in abutment with said portion of the bottom opening edge 32 of said follower opening 14 in said disengaged position. The elastic means 25 contribute to bringing the portion of the bottom opening edge 32 in abutment against such a support segment 31.

In accordance with one embodiment, the second cam 16 comprises a bottom segment 30 which penetrates the pin portion 29 transversely to the selector element sliding direction B-B and in the first follower sliding direction S-S and towards said free end of first follower 17, to leave a space in the pin element 29 to allow the first follower 13 to reach the engaged position.

In accordance with one embodiment, said second cam 16 comprises an inclined segment 33 which connects one end of said support segment 31 with one end of said bottom segment 30 to allow a gradual transition of said first follower 13 from said disengaged position to said engaged position, and vice versa.

The thickness s of the pin element 29 as measured in the first follower sliding direction S-S at said bottom segment 30 is less than the thickness of the pin element 29 as measured in the first follower sliding direction S-S at said support segment 31.

Figure 14:
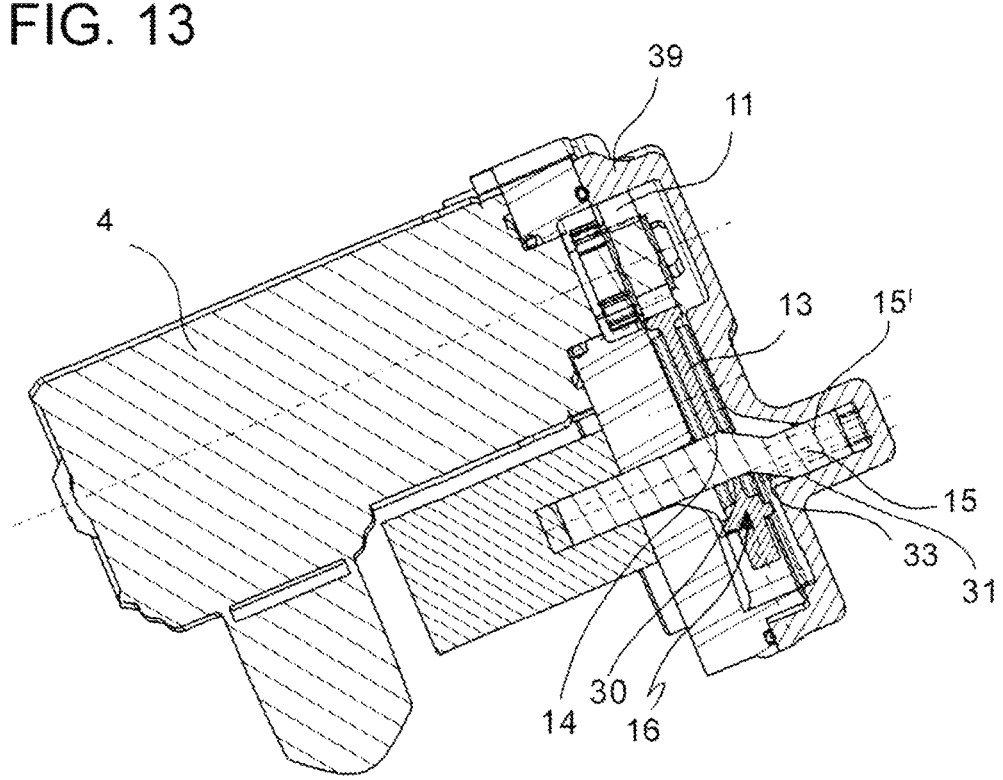
FIG. 14 shows an embodiment of the locking device according to the invention, in which the selector element has an offset portion in engaged position and therefore with parking brake applied.
Figure 15:
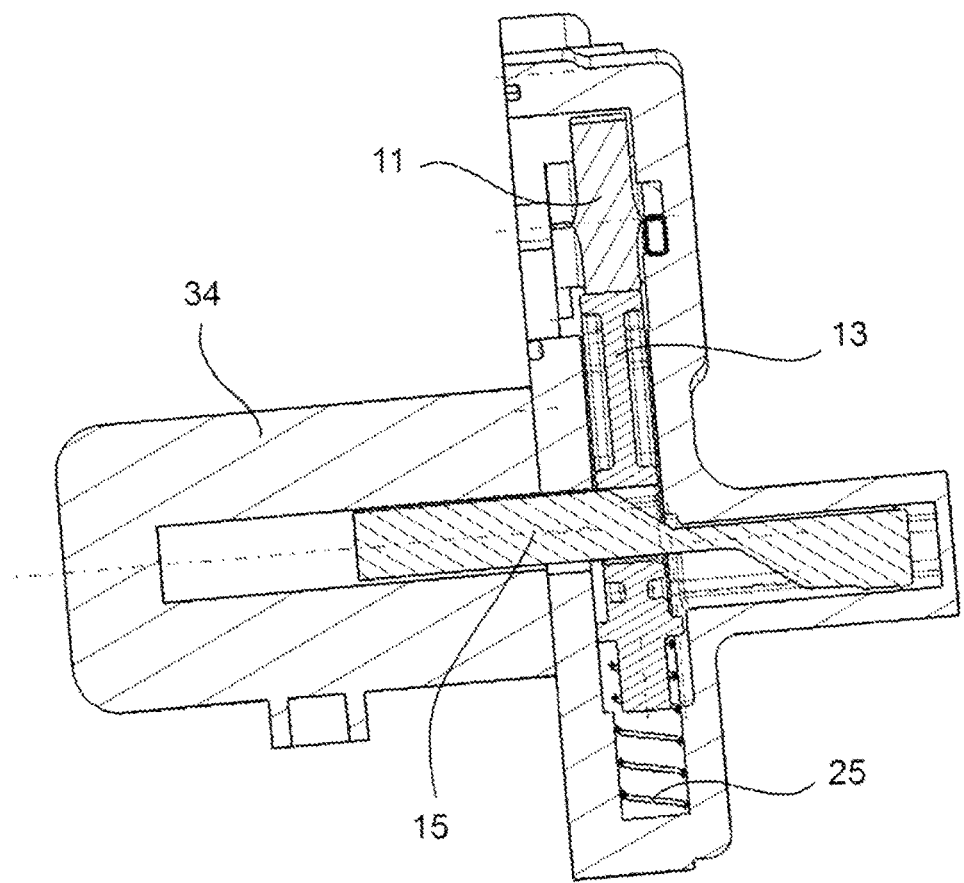
FIG. 15 shows a sectional view of the locking device, alone, of FIG. 14, in disengaged position and therefore with parking brake released.

In accordance with one embodiment, as shown for example in FIGS. 14 and 15, the selector element 15 comprises an offset end portion 15' forming said second cam 16, comprising said inclined segment 33.

In accordance with one embodiment, the locking device 1 comprises a linear actuator 34 adapted to move said selector element between said first selector element position and said second selector element position.

In accordance with one embodiment, the linear actuator 34 is an electromagnetic actuator, for example a solenoid actuator, or an electric motor for imparting the required linear movement. In accordance with one embodiment, the electric motor is a linear motor which directly connects to said selector element to move it between said first selector element position and said second selector element position, and vice versa. In accordance with a further embodiment, said electric motor is of the rotary type keyed downstream of a nut screw of a screw-nut screw system capable of moving, with a desired irreversible drive ratio, said selector element between said first selector element position and said second selector element position, and vice versa.

In accordance with one embodiment, the linear actuator 34 is configured to change the position of the selector element 15 between the first position and the second position, and vice versa, only if electrically powered, and is configured to keep the selector element 15 in the first position or in the second position when it is not electrically powered.

In accordance with one embodiment, the electromagnetic linear actuator 34 is of the bistable type, for example a bistable solenoid actuator, which comprises a first electrical winding adapted to move the selector element 15 from the first position to the second position when the first electrical winding is electrically powered, and a second electrical winding opposite to the first electrical winding adapted to move the selector element 15 from the second position to the first position when the second electrical winding is electrically powered. In accordance with one embodiment, the electromagnetic linear actuator 34 is of the bistable type, for example a bistable solenoid actuator, which comprises a single winding adapted to move the selector element 15 from the first position to the second position when powered with "positive" current, and adapted to move the selector element 15 from the second position to the first position when powered with "negative" current or of direction/phase opposite to the preceding one.

Although this solution requires controlling the two windings separately, or driving currents with opposite directions/phases, it advantageously allows a mechanical engagement device to be avoided, thus simplifying the construction of the device.

In accordance with one embodiment, the locking device 1 comprises means for retaining said selector element to keep said selector element in said first and second position when the first and second windings are not electrically powered, for example said retaining means comprise magnets or snap mechanical blocks.

In accordance with one embodiment, the electromagnetic actuator 34 is of the monostable type and comprises an electrical winding adapted to move the selector element 15 from the first position to the second position when the winding is electrically powered, and comprises return means to bring the selector element 15 back from the second position to the first position when the winding is not powered; and the locking device 1 comprises a mechanical engagement device adapted to keep the selector element 15 in said second position of said electromagnetic actuator 34 following a first electricity supply of the electrical winding, and to allow the return of the selector element 15 in the first position following a second and successive electricity supply.

Although it requires a mechanical engagement device, this solution advantageously allows a simpler electrical connection and a simpler control of the device because only one electrical winding requires to be electrically powered. In accordance with one embodiment, the locking device 1 comprises a selector element engagement device 48 adapted to engage the selector element in said first selector element position and/or in said second selector element position, for example said selector element engagement device 48 is a snap engagement device.

In accordance with one embodiment, the selector element engagement device 48 comprises an engagement body 49 adapted to be pushed against an outer side surface 50 of said selector element 15, or against an outer surface of said pin portion 29 of selector element, in which said outer side surface 50 of said selector element 15, or said outer surface of said pin portion 29 of selector element, comprises a first notch 47 adapted to receive a portion of said engagement body 49 when said selector element 15 is in said first position to keep the selector element 15 in said first position, and/or comprises a second notch 46 adapted to receive a portion of said engagement body 49 when said selector element 15 is in said second position to keep the selector element 15 in said second position.

In accordance with one embodiment, the selector element engagement device 48 comprises elastic thrust means adapted to push said engagement body in a direction transversal to the selector element sliding direction B-B.

Figure 9:
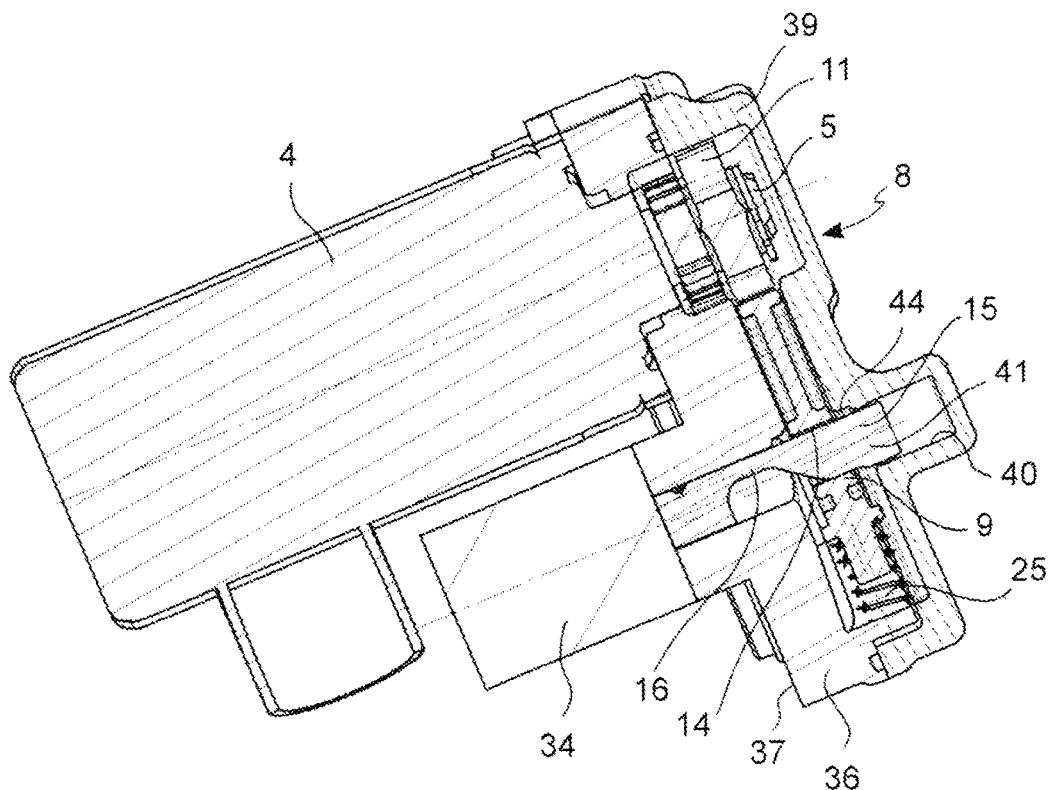
FIG. 9 shows a sectional view of another embodiment of a locking device according to the invention, sectioned through a sectional plane V-V, in which the fastening device comprises an elastic retaining ring.
Figure 10:
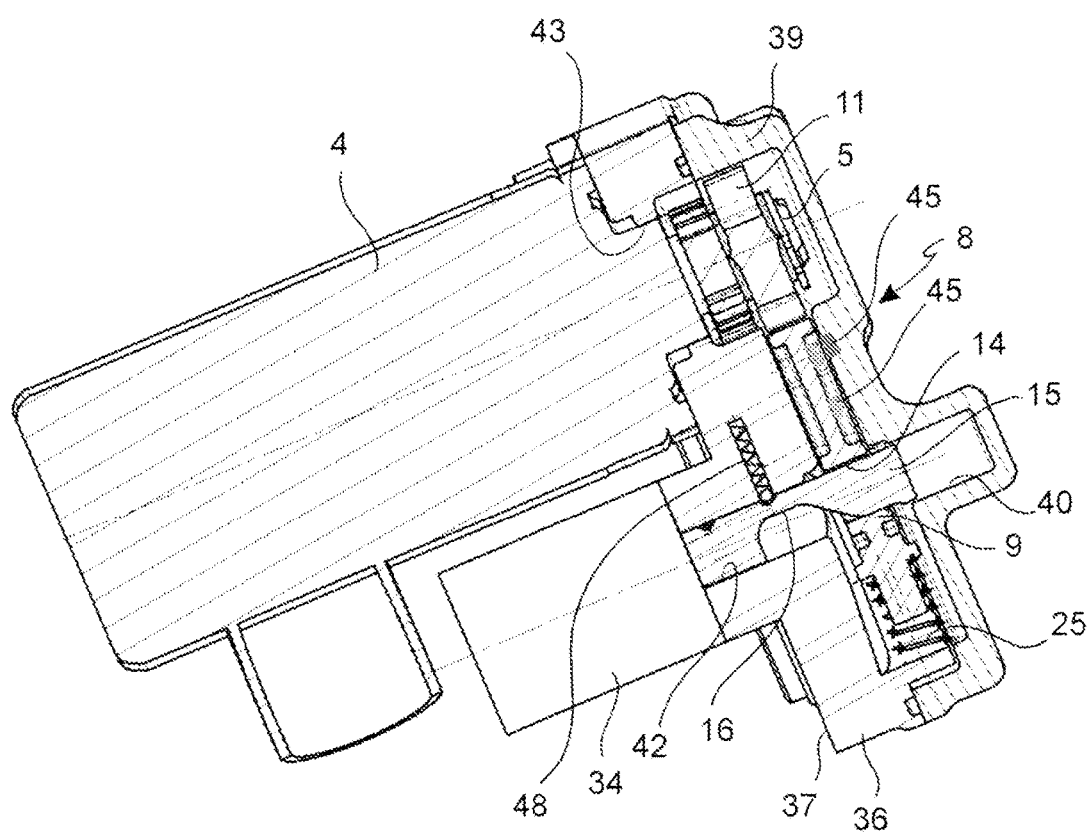
FIG. 10 shows a sectional view of a further embodiment of a locking device according to the invention, sectioned through a sectional plane V-V, comprising position sensors.

In accordance with one embodiment, said engagement body is an elastic gasket (FIG. 9).

In accordance with one embodiment, the locking device 1 comprises a support plate 36, or support tray 36, adapted to be attached to the caliper body 2 and defining an outer face 37 and an opposite inner face 38.

In accordance with one embodiment, said support plate 36 is adapted to slidingly support said selector element 15 through a first through-opening of the support plate 42.

In accordance with one embodiment, said linear actuator 36 is attached to said support plate 36, for example said actuator 36 is attached to the outer face 37.

Figure 4:
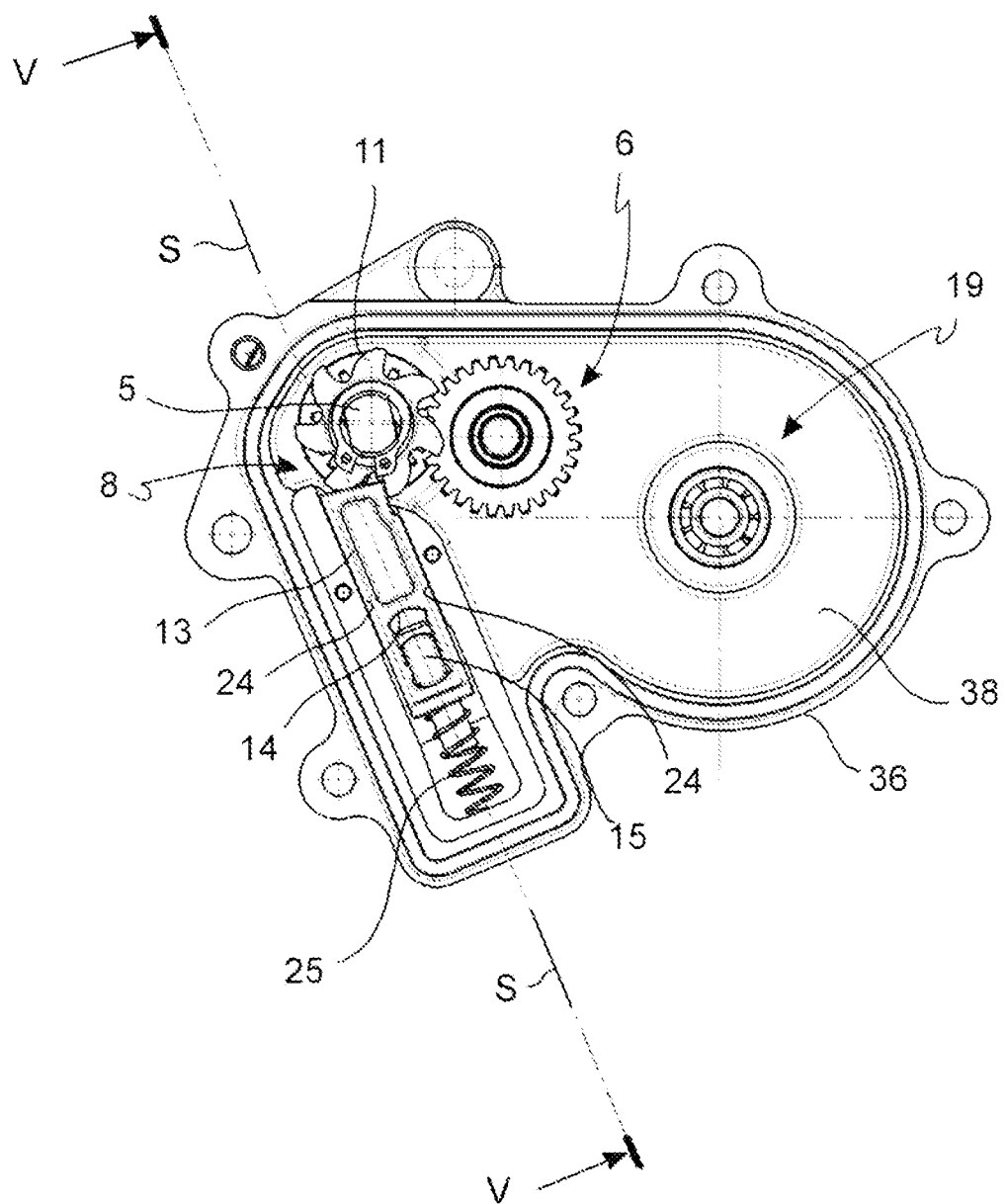
FIG. 4 shows an axonometric view of the locking device in FIG. 3, in a parking braking position.
Figure 5:
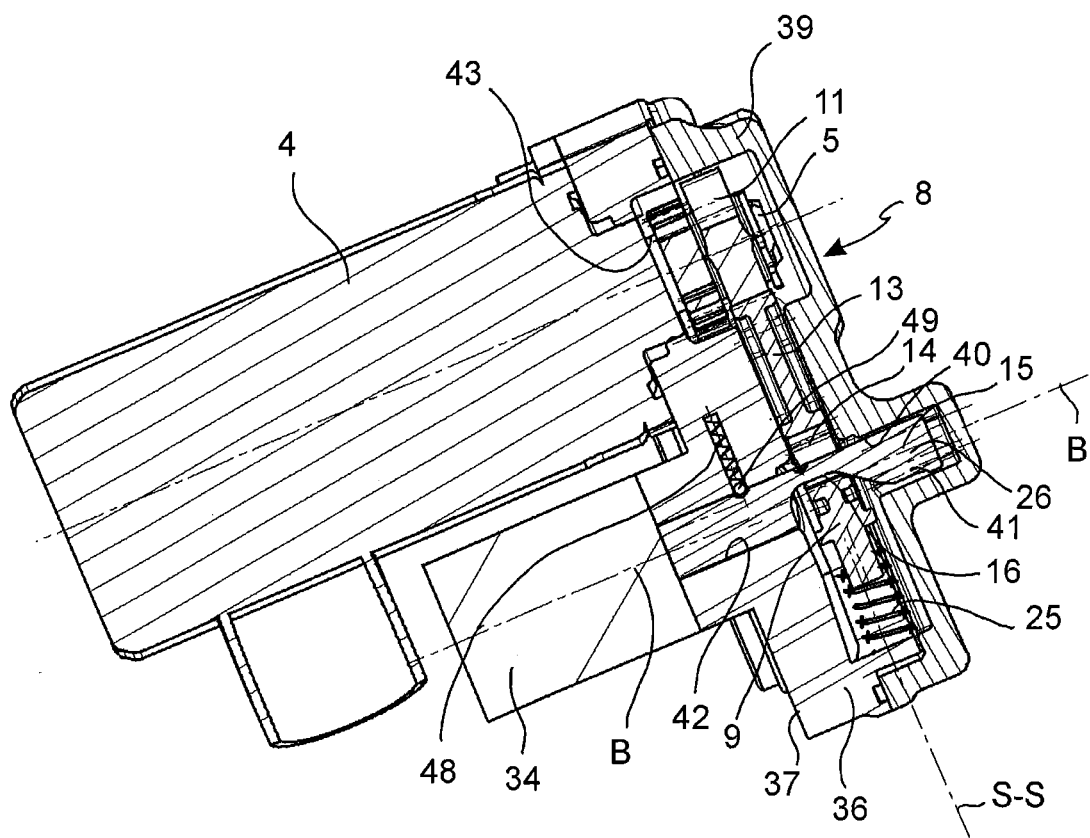
FIG. 5 shows a sectional view of the locking device in FIG. 4, sectioned through a sectional plane V-V.
Figure 6:
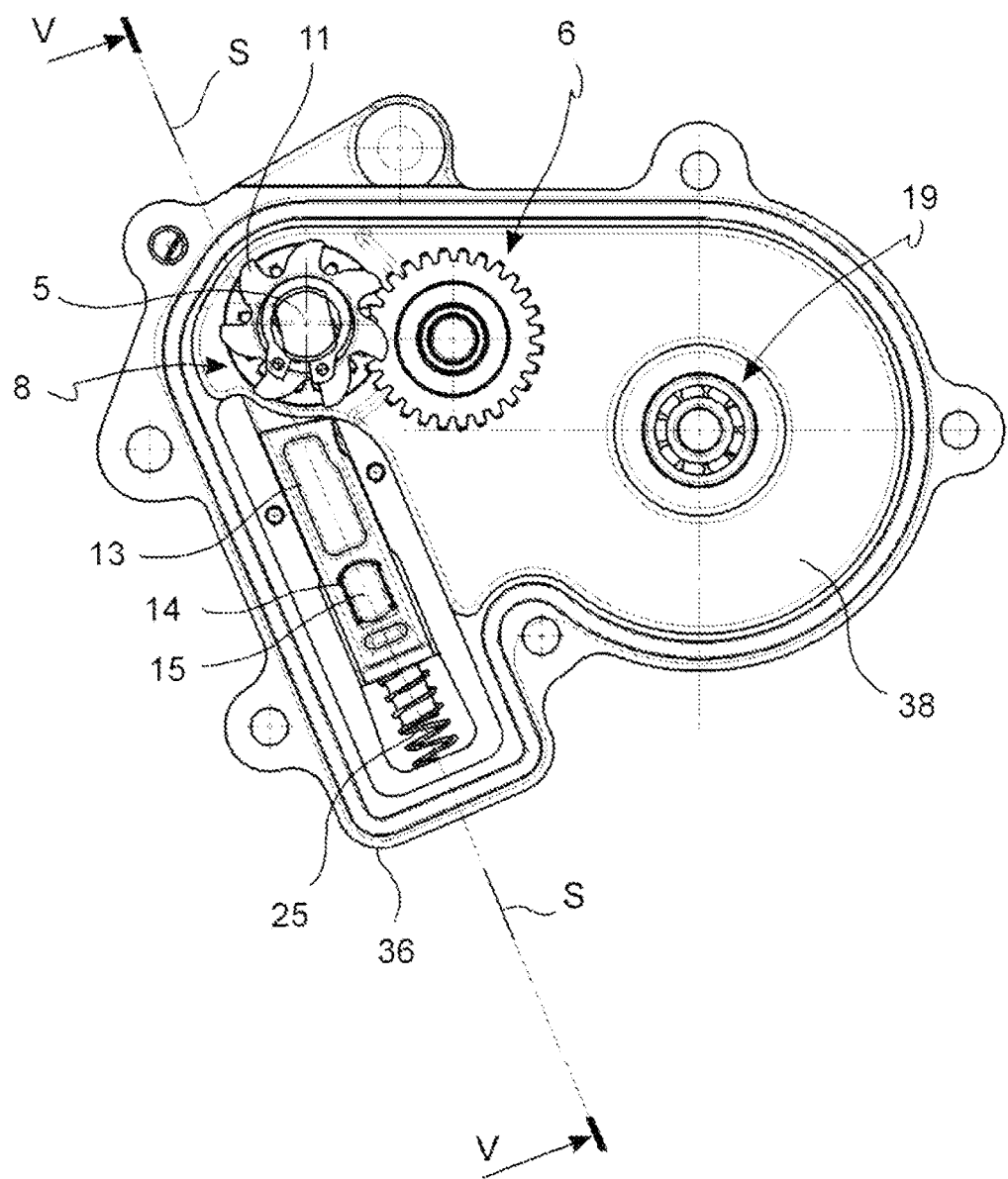
FIG. 6 shows an axonometric view of the locking device in FIG. 3, in a position without parking braking.
Figure 7:
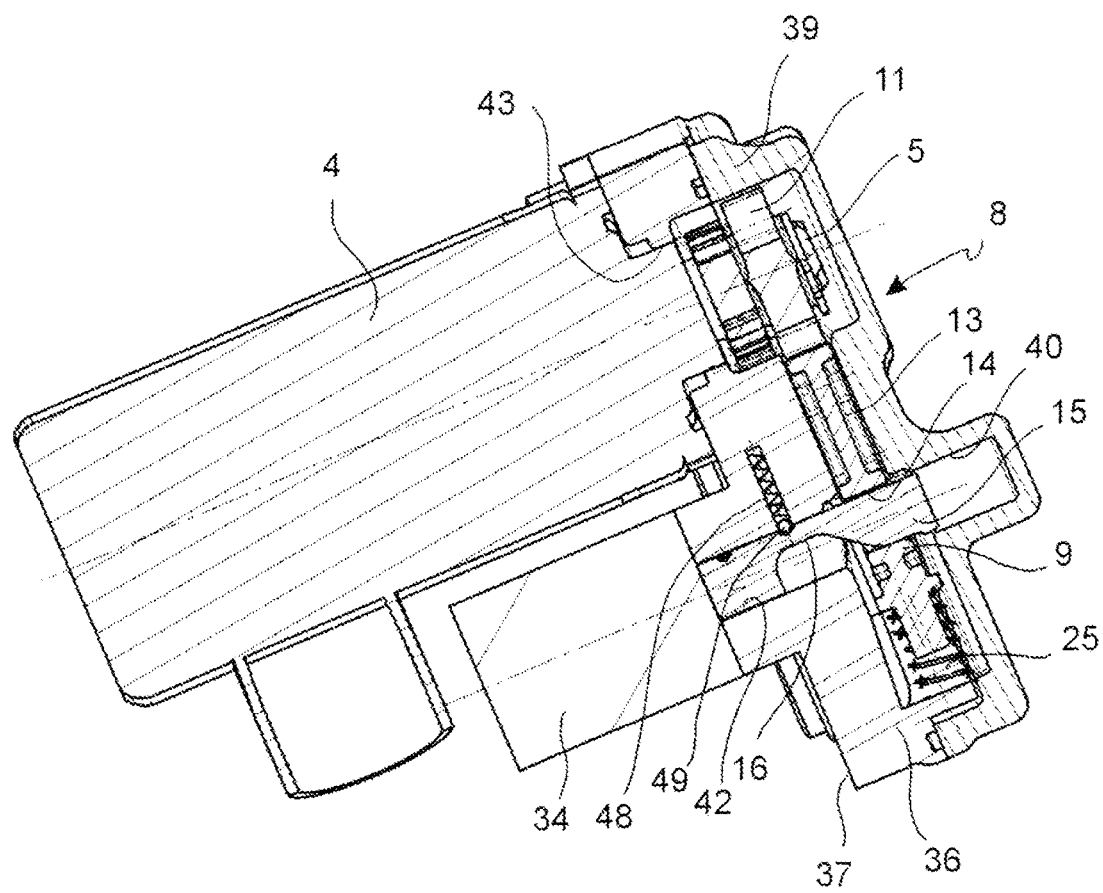
FIG. 7 shows a sectional view of the locking device in FIG. 6, sectioned through a sectional plane V-V.
Figure 8:
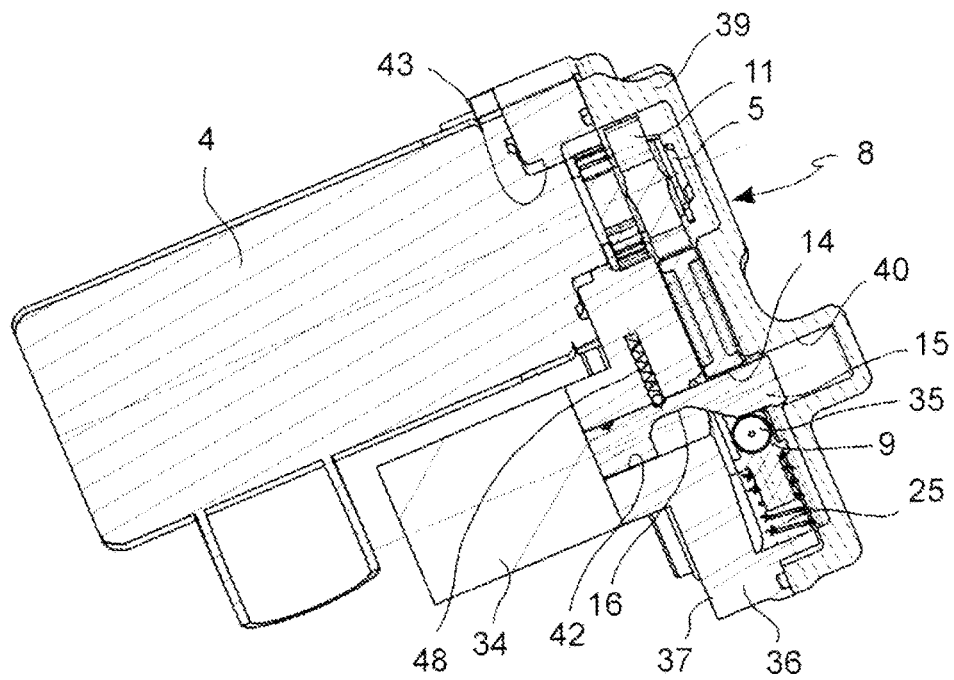
FIG. 8 shows a sectional view of one embodiment of a locking device according to the invention, sectioned through a sectional plane V-V, comprising a fastening device comprising a rolling body.

In accordance with one embodiment, as for example shown in FIGS. 4, 6 and 11, said counter sliding surfaces 24 are made in said support plate 36, for example in said inner face 38.

In accordance with one embodiment, said drive shaft 5 is slidingly supported by said support plate 36 through a second through-opening of the support plate 43.

In accordance with one embodiment, the electric motor 4 is attached to said support plate 36, for example is attached to the outer face 37.

In accordance with one embodiment, for example as shown in FIGS. 1, 5, 7 to 10, the locking device comprises a cover 39 adapted to be attached to said support plate 36 facing said inner face 38, so as to form a closed compartment between said support plate 36 and said cover 39 for containing said ratchet 8 in said closed compartment.

In accordance with one embodiment, the locking device comprises a guide surface 40 adapted to slidingly guide a free end portion 41 of said selector element 15 or of said pin portion 29 of selector element.

In accordance with one embodiment, said guide surface 40 is made in said cover 39 and is aligned with said first opening of support plate 42.

In accordance with one embodiment, said guide surface 40 is the surface of a hole, e.g. a blind hole.

In accordance with one embodiment (FIG. 8), the second follower 9 comprises a rolling body 35 interposed between said opening 14 and said second cam 16, in contact with said second cam 16. Thereby, a reduction is obtained of the friction between the second follower 9 and the selector element 15.

In accordance with one embodiment (FIG. 9), the guide surface 40 houses a gasket 44, or an elastic ring 44, for example metallic, which is operatively interposed between said guide surface and said free end of selector element 41 to facilitate the sliding of the free end of selector element 41 in said guide surface 40.

In accordance with one embodiment, the locking device 1 comprises at least one selector element position sensor adapted to detect the position of the selector element 15 in the selector element sliding direction B-B, or with respect to the support plate 36.

In accordance with one embodiment, the at least one selector element position sensor is integrated in the linear actuator 34.

In accordance with one embodiment (FIG. 10), the locking device 1 comprises at least one first follower position sensor 45 adapted to detect the position of said first follower 13 in the first follower sliding direction S-S.

In accordance with one embodiment, the at least one first follower position sensor 45 is integrated in the first follower 13.

In accordance with one embodiment, the at least one first follower position sensor 45 comprises an active portion adapted to be electrically powered, which is integral with one of said first follower 13 and said cover 39 or said support plate 36, and a passive portion which does not require to be electrically powered and is adapted to act in conjunction with the active portion, which is integral with the other of said first follower 13 and said cover 39 or said support plate 36. For example, the active portion is integral with said cover or said support plate, and the passive portion is integral with the first follower 13.

In accordance with one embodiment, the locking device 1 is made as a separate unit from the brake caliper 3 adapted to be mounted on a brake caliper 3.

According to another aspect of the present invention, the aforesaid objects and advantages are met by an electromechanically-operated brake caliper 3 for a disc brake, comprising a caliper body 2 suitable for being arranged astride a brake disc 7 having a first braking surface 7' and a second braking surface 7".

The caliper body 2 comprises a first vehicle side portion 2' suitable for facing said first braking surface 7' of the brake disc, said first vehicle side portion 2' comprising thrust means 19 housed therein to allow said at least one brake pad to move close to/away from said disc 7.

The first portion 2' comprises at least one first seat suitable for receiving at least one first pad suitable for facing and being arranged substantially parallel to said first braking surface 7'.

The at least one first pad being housed in said at least one first seat in a sliding manner and so as to be arranged between said first vehicle side portion 2' and said first braking surface 7' and to exert a braking action on the brake disc 7 when affected by said thrust means 19.

The brake caliper 3 comprises a rotary electric motor 4 having a drive shaft 5.

The thrust means 19 are adapted to receive a rotary motion and a torque from said rotary electric motor 4 and to convert said rotary motion into translation motion to affect said at least one pad.

Caliper 3 comprises a gearbox 6 operatively connected with an input side thereof to said drive shaft 5 to receive a movement and a driving torque and transmit them with an output side thereof to said thrust means 19.

The caliper comprises a locking device 1 as described above, in which said rotating element 11 of said ratchet 8 is connected to receive a rotation motion from said drive shaft 5.

According to another aspect of the present invention, the aforesaid objects and advantages are met by an electromechanically-operated parking brake caliper 3 for a disc brake, comprising a caliper body 2 suitable for being arranged astride a brake disc 7 having a first braking surface 7' and a second braking surface 7".

The caliper body 2 comprises a first vehicle side portion 2' suitable for facing said first braking surface 7' of the brake disc, said first vehicle side portion 2' comprising thrust means 19 housed therein to allow said at least one brake pad to move close to/away from said disc 7.

The first portion 2' comprises at least one first seat suitable for receiving at least one first pad suitable for facing and being arranged substantially parallel to said first braking surface 7'.

The at least one first pad being housed in said at least one first seat in a sliding manner and so as to be arranged between said first vehicle side portion 2' and said first braking surface 7' and to exert a braking action on the brake disc 7 when affected by said thrust means 19.

The brake caliper 3 comprises a rotary electric motor 4 having a drive shaft 5.

The thrust means 19 are adapted to receive a rotary motion and a torque from said rotary electric motor 4 and to convert said rotary motion into translation motion to affect said at least one pad.

Caliper 3 comprises a gearbox 6 operatively connected with an input side thereof to said drive shaft 5 to receive a movement and a driving torque and transmit them with an output side thereof to said thrust means 19.

The caliper comprises a locking device 1 as described above, in which said rotating element 11 of said ratchet 8 is connected to receive a rotation motion from said drive shaft 5.

In accordance with one embodiment, the rotating element is attached or can be attached coaxially to the drive shaft 5 of a rotary electric motor 4 adapted to provide a rotary motion and a torque to thrust means 19 configured to move at least one brake pad close to/away from a brake disc 7.

In accordance with one embodiment, the rotating element 11 is mounted on the drive shaft 5 so as to prevent any related rotation between rotating element 11 and drive shaft 5, for example by means of a shape coupling.

In accordance with one embodiment, the rotating element 11 is axially restrained to the drive shaft 5 by means of a Seeger® ring.

According to another aspect of the present invention, these and other objects and advantages are met by a method for operating an electromechanically-operated brake caliper 3 as described above, to operate a parking braking, comprising the steps of:
  operating the electric motor 4 to rotate the drive shaft 5 in a first braking direction of rotation to push said at least one pad against said first braking surface 7' up to reaching a thrust force value suitable for operating a parking braking, said drive shaft 5 simultaneously rotating said rotating element 11 in said first direction of rotation;
  translating said selector element 15 from said first position to said second position to keep said first follower 13 in an engaged position in contact with said rotating element 11 to allow the application of a parking braking action;
  rotating said rotating element 11 in said second direction of rotation up to bringing the first cam 12 in abutment against said first follower 13;
  stopping the operation of the electric motor 4.

In accordance with one embodiment, the step of rotating said rotating element 11 in said second direction of rotation R up to bringing the first cam 12 in engaging abutment against said first follower 13 is executed by operating the electric motor 4 in a direction of rotation adapted to rotate said rotating element 11 in the second direction of rotation R;
or by stopping the operation of the electric motor 4 and allowing the reaction force of the pads to rotate the rotating element 11 in the second direction of rotation R;
or by keeping the electric motor 4 operating in a direction of rotation adapted to affect the rotating element 11 in the first direction of rotation A to dampen the rotation of the rotating element 11 in the second direction of rotation R due to the reaction force of the pads. In accordance with one embodiment (FIG. 15), the linear actuator 34 can be controlled so as to impose three different positions on the selector element 15. Two positions of the selector element 15 correspond to the ones described above in FIG. 5 and FIG. 7. The third position, depicted in FIG. 15, allows the first follower 13 to be forced in engaged position with the rotating element 11 if, during a reapplication of the braking force on the parked vehicle (rotation of the rotating element 11 in the first direction of rotation, with the force exchanged between pads and disc increasing), the thrust spring 25 has a breakdown for which the engagement of the first follower 13 with the rotating element 11 may no longer be ensured. Due to this solution, the loss of the braking load is avoided in case of breakdown of the thrust spring 25 during the step of automatic reapplication of the braking force in the absence of the driver.

According to another aspect of the present invention, these and other objects and advantages are met by a method for operating an electromechanically-operated brake caliper 3 as described above, to remove a parking braking, comprising the steps of:
  rotating the rotating element 11 in the first direction of rotation up to disconnecting said rotating element (11) from said first follower 13, for example by operating the electric motor 4;
  translating said selector element 15 from said second position to said first position to keep said first follower 13 away from said first cam 12;
  operating the electric motor 4 to rotate the drive shaft 5 in a second braking direction of rotation to move said at least one pad away from said first braking surface 7' up to removing the parking braking, said drive shaft 5 simultaneously rotating said rotating element 11 in said second direction of rotation.

The locking device of an electromechanically-operated brake caliper 3 for a disc brake described above in terms of its technical features will now be described in terms of the operation thereof.

The application of the parking braking, or insertion of the parking brake, occurs by first operating the electric motor 4 up to reaching the parking load required.

The rotating element comprising the first cams is integral with the drive shaft 5, therefore rotates at the same time as the rotation of the motor. With reference to the accompanying drawings, the drive shaft and the rotating element are rotated in counterclockwise direction.

Once the predetermined parking load value is reached, the selector element 15 is actuated in translation from the first position to the second position, for example by operating the linear actuator 34.

During the translation of the selector element 15, the cooperation between the second cam 16 of the selector element 15 and the second follower 9 brings the first follower in engaged position.

Once this step is complete, the electric motor 4 is operated in an opposite direction of rotation, in clockwise direction with reference to the figures, up to bringing a first cam in abutment against a side of the free end of first follower.

Thereby, the parking braking condition is achieved and maintained. Under such a condition, the reaction force to the parking involves the thrust means 19 for moving the pads close to/away from the braking surfaces of the disc, gearbox 6 interposed between the drive shaft 5 and the thrust means 19, the drive shaft 5, the rotating element 11, the first follower 13, the support plate 36, and does not involve, instead, the other components.

After the application of the parking braking, and therefore with the vehicle stopped, the brake components may cool down, with subsequent reduction of the sizes. In these circumstances, but also in others, the compression force of the pads against the braking surfaces may decrease, thereby decreasing the load applied.

The locking device of the present invention may be used to restore the braking load required to ensure the parking braking action is maintained, for example in the following manner.

Once the parking braking is applied, therefore in the engaged position of the first follower 13, the electric motor 4 is operated in the direction of rotation of load application, in counterclockwise direction with reference to the figures, up to reaching the predetermined braking load required to reach and maintain the parking braking action again.

The release of the parking braking, or disengagement of the parking brake, occurs by operating the electric motor 4, in counterclockwise direction with reference to the figures, up to disconnecting the first segment of first cam 12' from the side surface 17' of the first follower 13.

The selector element 15 is then operated to slide from the second position to the first position, for example by operating the linear actuator.

During the translation of the selector element 15, the cooperation between the second cam 16 of the selector element 15 and the second follower 9 brings the first follower in disengaged position.

With reference to the accompanying drawings, once this step is complete, the drive shaft 5 and the rotating element 11 are rotated in counterclockwise direction up to moving the pads away from the braking surfaces of the brake disc.

Advantageously, the locking device described above requires operating the actuator only in the transition between the engaged condition and the disengaged position, and avoids requiring a continuous power supply of the actuator during the entire disengaged step or during the entire engaged step.

This results in significant advantages, including very safe use because no interruption in the electricity supply of the actuator, or a breakdown, or a malfunction, ever causes an undesired change in status between the engaged position and the disengaged position, or vice versa. Indeed, in case of an interruption in power supply or breakdown, such a locking device remains in the existing status when such a condition occurs. This allows a highly reliable locking device to be provided.

Advantageously, the locking device does not require to be continuously powered to keep the disengaged position, that is with parking brake disengaged.

Equally advantageously, the locking device does not require to be continuously powered to keep the engaged position, that is with parking brake engaged.

Moreover, the parking locking device advantageously requires to be electrically powered only when changing the position between engaged position and disengaged position.

In other words, the locking device according to the invention not only ensures safety of use by preventing the involuntary operation or disabling of the parking brake, but also allows less onerous electromechanical dimensioning.

Advantageously, in order to operate the selector element, the actuator is not directly stressed by the parking force, with subsequent smaller stresses. This allows a compact-sized actuator to be used and allows materials to be used which do not necessarily have significant mechanical features. Accordingly, the cost of the device is thereby reduced.

Advantageously, if the motor should not ensure the coverage of the angular sector between the two first adjacent cams, no involuntary change of status would occur along such a sector between the engaged position and the disengaged position, and vice versa. In other words, the status of application or non-application of the parking brake at the preceding cam, would be maintained.

In other words, no involuntary loss of parking braking load would occur in such a case.

Another important advantage produced by the present invention is given by the fact that, if the spring adapted to push the first follower against the rotating element breaks, it would not cause any involuntary insertion of the parking brake.

Advantageously, moreover, when there is a loss of parking braking load due to the variation in volume of the braking components following temperature variations, for example following the cooling of the brake when the vehicle is stopped, the locking device according to the invention advantageously allows the parking load lost to be reapplied by acting only on the motor and not on the actuator of the selector element.

Such a locking device, therefore, does not require acting on the selector element to restore the parking braking load, but only on the motor used to move and push the pads against the braking surfaces of the brake disc. This contributes to reducing the use of the actuator of the selector element, and therefore to increasing the reliability and safety of use.

A person skilled in the art may make several changes and adaptations to the above-described embodiments of the device, and substitute elements with other functionally-equivalent ones, in order to meet contingent needs, without thereby departing from the scope of the following claims.

Each of the features described as belonging to a possible embodiment may be achieved irrespective of the other embodiments described. Various means and materials may be used to perform the different functions described without thereby departing from the scope of the invention. It should be understood that the expressions and terminology used serve a merely descriptive purpose and are therefore non-limiting.

REFERENCES 1 locking device
2 caliper body
2' first portion
3 brake caliper
4 electric motor
5 drive shaft
6 gearbox
7 brake disc
7' first braking surface
7" second braking surface
8 ratchet
9 second follower
11 rotating element
12 first radial cam
12" first cam segment
12' second cam segment
13 first follower
14 first follower opening
15 selector element 16 second cam
17 free end of first follower
17' side surface
17" head surface
18 sliding surfaces
19 thrust means
22 wheel axis
23 wheel radial direction
24 sliding counter surfaces
25 Seeger ring
26 opening edge
27 straight opening edge segments
28 side flattenings
29 pin portion
30 bottom segment
31 support segment
32 portion of the bottom abutment opening edge
33 inclined segment
34 linear actuator
35 rolling body
36 support plate
37 outer face of support plate
38 inner face of support plate
40 guide surface
41 free end of selector element
42 first through-opening of the support plate
43 second through-opening of the support plate
44 gasket
45 first follower position sensor
46 second notch
47 first notch
48 selector element engagement device
49 engagement body
A first direction of rotation
R second direction of rotation

The invention claimed is:

1. A locking device of an electromechanically-operated brake caliper for a disc brake, comprising:
a ratchet comprising a rotating element having at least one first cam and one first follower pushed elastically against said rotating element, said one first follower configured to act in conjunction with said at least one first cam to allow the rotation of the rotating element in a first direction of rotation and to prevent the rotation of the rotating element in a second direction of rotation opposite to said first direction of rotation;
a selector element sliding between a first selector element position and a second selector element position, said selector element being adapted to operate said first follower so that, in said first selector element position, said selector element keeps said first follower in a disengaged position away from the rotating element to prevent the application of a parking braking action, and so that, in said second selector element position, the selector element keeps said first follower in an engaged position in contact with said rotating element to allow the application of a parking braking action,
said selector element having a second cam and said first follower having a first follower opening and second follower, said second cam being configured to act in conjunction with said second follower to operate said first follower between said engaged position and said disengaged position.

2. A locking device according to claim 1, wherein the rotating element is a wheel defining a wheel rotation axis and a wheel radial direction orthogonal to the wheel rotation axis, and wherein the at least one first cam extends in a radial direction and wherein the at least one first cam comprises a first cam profile segment and a second cam profile segment adjacent to said first cam segment, and wherein the first cam profile segment is arranged in the radial direction, and wherein the first cam profile segment is arranged in a direction that promotes engagement with the first follower and the maintenance of such a position, and wherein the second cam profile segment is inclined with respect to the radial direction, and wherein the second cam profile segment extends in a direction adapted to promote the sliding of the second cam profile segment with respect to the first follower, and wherein the second cam profile segment moves away from the wheel axis proceeding angularly towards said first cam profile segment on only one side of said first cam profile segment, and wherein the first cam profile segment is facing in a direction of clockwise rotation of the wheel, and wherein said at least one first cam is defined by a first cam surface and a second cam surface adjacent to the first cam surface, wherein said first cam surface comprises said first cam profile segment and such a second cam surface comprises said second cam profile segment, and wherein the first cam surface and the second cam surface extend in directions parallel to the wheel axis.

3. A locking device according to claim 2, wherein the rotating element comprises a plurality of cams distributed along the periphery of said wheel and equally spaced from one another at a pitch having a predetermined value, wherein said predetermined pitch value is chosen so as to ensure a safe and firm engagement of said rotating element against said first follower to prevent the rotation of the rotating element in a second direction of rotation and at the same time to ensure a free rotation of the rotating element in the first direction of rotation.

4. A locking device according to claim 1, wherein the first follower is restrained to the locking device to slide in a predetermined first follower sliding direction with respect to the rotating element, and wherein the first follower comprises an elongated element which extends along said first follower sliding direction and comprises a free end facing the rotating element, and wherein the free end of the first follower is defined by a side surface arranged laterally, or longitudinally, with respect to the first follower sliding direction, and by a head surface arranged transversely to the first follower sliding direction, and wherein the side surface is configured to receive in abutment the first cam profile segment of a first cam, and the head surface is adapted to receive in abutment the second cam profile segment of another first cam arranged downstream of the first cam in the second direction of rotation, and wherein the first follower sliding direction belongs to a plane orthogonal to the wheel axis and is arranged in a tangential direction with respect to the wheel axis, or is orthogonal to a radial direction, and wherein said first follower is restrained to the locking device to rotate or roto-translate about a point of the locking device, said first follower sliding direction belonging to a plane orthogonal to the wheel axis and consisting of a line corresponding to the trajectory covered by said first follower during said rotation or roto-translation, and wherein the side surface and the head surface extend orthogonally to a plane orthogonal to the wheel axis, and wherein the side surface and the head surface are substantially orthogonal to each other, and wherein the side surface and the head surface are substantially orthogonal to each other and are inclined at a predetermined angle relative to the first follower sliding direction, and wherein the side surface extends in a direction parallel to the wheel radial direction, or along such a direction as to promote the engagement with the first follower, and wherein the head surface extends in a direction which is orthogonal to the wheel radial direction, or tangentially to the wheel, and wherein the side surface extends along a plane parallel to a radial plane passing through the wheel axis, and wherein the head surface extends along a plane substantially orthogonal to a radial plane passing through the wheel axis, or along a plane which allows the engagement thereof with the first follower, and wherein the first follower comprises two opposite lateral sliding surfaces parallel to each other and parallel to the first follower sliding direction, which are slidingly engaged with counter sliding surfaces integral with said locking device, and wherein the counter sliding surfaces of the locking device are surfaces parallel to each other and having a curved portion approaching the rotating element, and wherein at least one portion of the first follower facing towards the rotating element is elastic so that the first follower is elastically deformed along the curved counter surfaces upon sliding from the disengaged position to the engaged position, thus accumulating elastic energy, and so that said first follower releases the elastic energy accumulated upon sliding from the engaged position to the disengaged position.

5. A locking device according to claim 1, wherein the selector element comprises a pin portion which extends in a selector element sliding direction and the first follower opening is an opening passing through the first follower configured to allow the sliding of the pin portion inside it in said selector element sliding direction, and wherein the opening of the first follower is defined by an opening edge, and wherein the opening edge comprises two straight opposite opening edge portions parallel to each other and to the first follower sliding direction, and wherein the opening edge comprises a portion of the bottom opening edge which connects one end of the opposite opening edge portions furthest away from the free end of first follower to each other, and wherein the portion of the bottom opening edge is substantially straight and orthogonal to said opposite opening edge portions, and wherein the portion of the bottom opening edge is substantially straight and orthogonal to the sliding direction of the first follower, and wherein the portion of the bottom opening edge forms said second follower, and wherein the pin portion comprises two side flattenings parallel to each other, and wherein the selector element sliding direction is substantially orthogonal to the sliding direction of the first follower, and wherein said selector element sliding direction is substantially parallel to the direction of the wheel rotation axis, and wherein the pin portion comprises a notch which laterally penetrates said pin portion, said notch forming said second cam and wherein said notch is defined by a cam surface which extends in a direction orthogonal to the selector element sliding direction and wherein said second cam comprises a support segment adapted to come in abutment with said portion of the bottom opening edge of said follower opening in said disengaged position, and wherein the second cam comprises a bottom segment which penetrates the pin portion transversely to the selector element sliding direction and in the sliding direction of the first follower and towards said free end of the first follower in order to leave a space in the pin element to allow the first follower to reach the engaged position, and wherein said second cam comprises an inclined segment connecting one end of said support segment to one end of said bottom segment to allow a gradual transition of said first follower from said disengaged position to said engaged position and vice versa, and wherein the thickness of the pin element as measured in the sliding direction of the first follower at said bottom segment is less than the thickness of the pin element as measured in the sliding direction of the first follower at said support segment, and wherein the selector element comprises an offset end portion forming said second cam, comprising said inclined segment.

6. A locking device according to claim 1, comprising a linear actuator adapted to move said selector element between said first selector element position and said second selector element position, and wherein the linear actuator is an electromagnetic actuator, for example a solenoid actuator, a linear and rotary electric motor keyed to a screw-nut screw system and wherein the linear actuator is configured to change the position of the selector element from the first position to the second position and vice versa only when electrically powered, and is configured to keep the selector element in the first position or second position when it is not electrically powered, and wherein the electromagnetic linear actuator is of the bistable type and of the bistable solenoid type, comprising a first electrical winding adapted to move the selector element from the first position to the second position when the first electrical winding is electrically powered, and a second electrical winding opposite to the first electrical winding adapted to move the selector element from the second position to the first position when the second electrical winding is electrically powered, and wherein comprising a single winding adapted to move the selector element from the first position to the second position when powered with "positive" current and adapted to move the selector element from the second position to the first position when the winding is powered with "negative" current, and wherein the electromagnetic actuator is of the monostable type and comprises an electric winding adapted to move the selector element from the first position to the second position when the winding is electrically powered, and comprises return means for bringing the selector element back from the second position to the first position when the winding is not powered, and wherein the locking device comprises a mechanical engagement device adapted to retain the selector element in said second position of said electromagnetic actuator following a first electricity supply of the electrical winding, and of allowing the return of the selector element to the first position following a second and successive electricity supply, and wherein the locking device comprises a selector element engagement device adapted to engage the selector element in said first selector element position and in said second selector element position, and wherein said selector element engagement device is a snap engagement device and wherein said selector element engagement device comprises an engagement body adapted to be pushed against an outer side surface of said selector element wherein said outer side surface of said selector element comprises a first notch adapted to receive a portion of said engagement body when said selector element is in said first position to keep the selector element in said first position, and wherein said outer side surface of said selector element comprises a second notch adapted to receive a portion of said engagement body when said selector element is in said second position to keep the selector element in said second position, and wherein the selector element engagement device comprises elastic thrust means adapted to push said engagement body in a direction transversal to the selector element sliding direction, and wherein the engagement body is an elastic gasket, and wherein the locking device comprises a support plate adapted to be attached to the caliper body and defining an outer face and an opposite inner face, and wherein said support plate is adapted to slidingly support said selector element through a first through-opening of the support plate wherein said linear actuator is attached to said support plate, and wherein said actuator is attached to the outer face, and wherein said counter sliding surfaces are made in said support plate, and wherein said sliding counter surfaces are made in said inner face and/or wherein said drive shaft is slidingly supported by said support plate through a second through-opening of the support plate, and wherein the electric motor is attached to said support plate, and wherein said electric motor is attached to the outer face, and wherein the locking device comprises a cover adapted to be attached to said support plate facing said inner face so as to form a closed compartment between said support plate and said cover for containing said ratchet in said closed compartment and wherein the locking device comprises a guide surface adapted to slidingly guide a free end portion of said selector element, or of said pin portion of the selector element and wherein said guide surface is made in said cover and is aligned with said first opening of the support plate and wherein said guide surface is the surface of a hole, for example a blind hole, and wherein the second follower comprises a rolling body interposed between said opening and said second cam, in contact with said second cam, and wherein the guide surface houses a gasket, or an elastic ring, for example metallic, which is operatively interposed between said guide surface and said free end of selector element to facilitate the sliding of the free end of selector element in said guide surface, and wherein the locking device comprises at least one selector element position sensor adapted to detect the position of the selector element in the selector element sliding direction, or with respect to the support plate and wherein the at least one selector element position sensor is integrated in the linear actuator, and wherein the locking device comprises at least one first follower position sensor adapted to detect the position of said first follower along the first follower sliding direction, and wherein the at least one first follower position sensor is integrated in the first follower, and wherein the at least one first follower position sensor comprises an active portion, adapted to be electrically powered, integral with one of said first follower and said cover or said support plate, and a passive portion which does not need to be electrically powered and is adapted to act in conjunction with the active portion, integral with the other between said first follower and said cover or said support plate, and wherein the locking device is made as a separate unit from the brake caliper adapted to be mounted on a brake caliper.

* * * * *